United States Patent [19]

Ohnhaus et al.

[11] 4,231,253
[45] Nov. 4, 1980

[54] AIR-FLOW CAPTURE AND CONTROL DEVICE FOR FLOW MEASUREMENT

[76] Inventors: Buff Ohnhaus, 120 Jackson NE., Albuquerque, N. Mex. 87108; James D. Faith, 9804 Mary Ellen Pl. NE., Albuquerque, N. Mex. 87111

[21] Appl. No.: 45,051

[22] Filed: Jun. 4, 1979

[51] Int. Cl.³ .............................................. G01F 1/46
[52] U.S. Cl. .................................................. 73/861.62
[58] Field of Search ........................................ 73/212

[56] References Cited

U.S. PATENT DOCUMENTS

| | | | |
|---|---|---|---|
| 2,342,290 | 2/1944 | Miller | 73/212 |
| 3,733,900 | 5/1973 | De Baun | 73/212 |
| 3,937,082 | 2/1976 | Schilling | 73/212 |
| 4,030,358 | 6/1977 | Noll | 73/212 |
| 4,036,054 | 7/1977 | Goulet | 73/212 |

Primary Examiner—Donald O. Woodiel
Attorney, Agent, or Firm—Frishauf, Holtz, Goodman & Woodward

[57] ABSTRACT

Four curtains are drawn or released together to set the measuring aperture of an air-flow measuring box at the desired area and the linear velocity of flow through the aperture is measured by a single-probe velometer normally held with the probe tip essentially at the center of the aperture, a perimeter sealing strip blocks unmeasured air flow around the back of the curtains. A box-like hood guides the air flow from a ceiling outlet under investigation to the curtained aperture and is provided with diagonal vanes to keep the measurement from being falsified by cyclonic air movement. The box-like hood folds up for storage or transportation.

11 Claims, 17 Drawing Figures

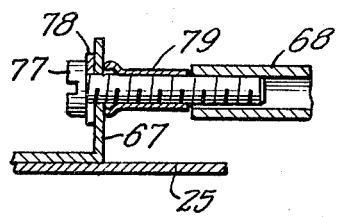
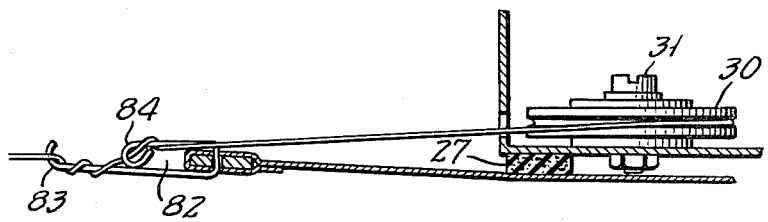
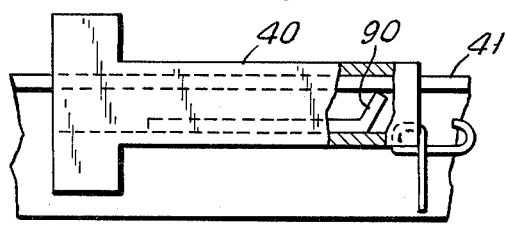
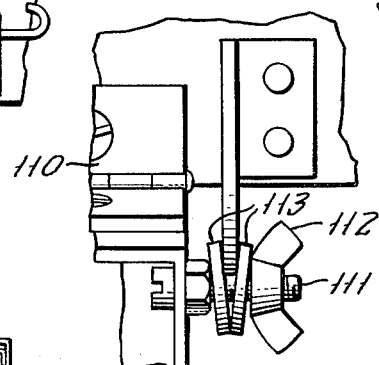
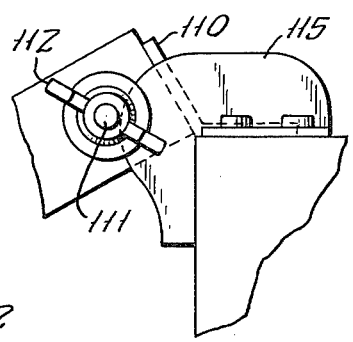
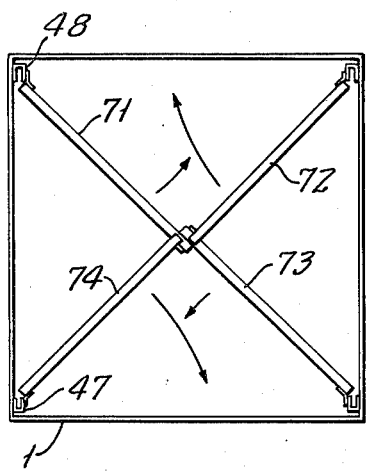
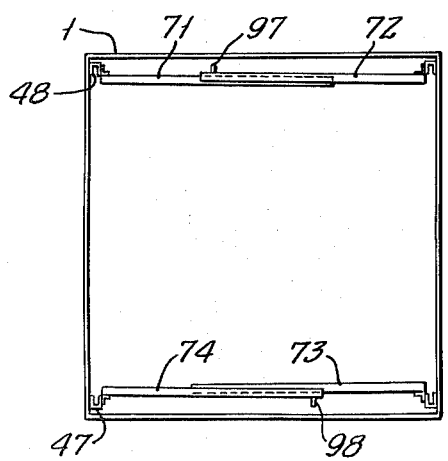
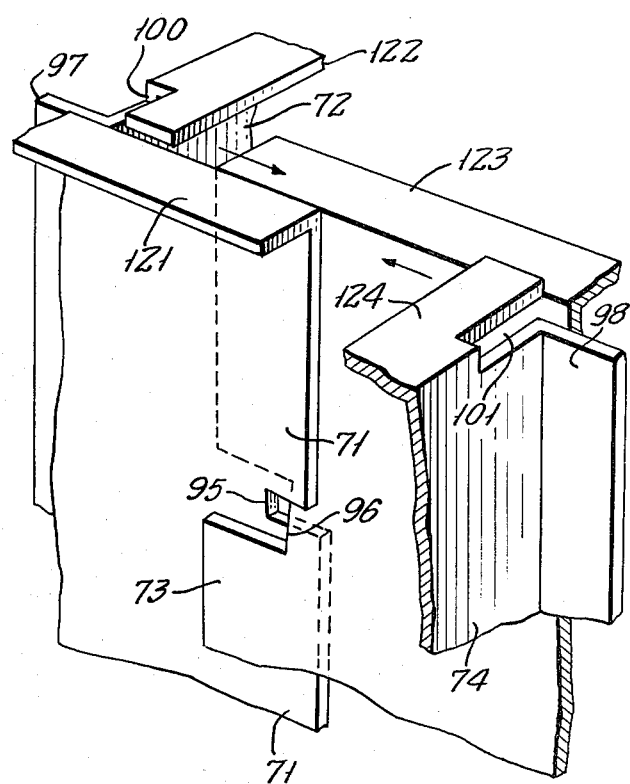

AIR-FLOW CAPTURE AND CONTROL DEVICE FOR FLOW MEASUREMENT

This invention concerns a portable apparatus for measuring the rate of air flow in or out of an opening such as a heating or air-conditioning outlet or inlet in a room or corridor.

It is necessary to measure the velocity of air entering or leaving the diffusers or grills of heating, ventilating or air-conditioning systems in order to achieve a desired balance of air discharged from the various outlets and collected by the various inlets, so that energy is not wasted by excessively cooling or heating some particular portion of the space served, and in order that the remaining space in the building or system may be adequately served. Since rearrangements by erecting partitions may affect the efficiency of a heating, ventilating or airconditioning system, it may be necessary to readjust the system from time to time, in order to provide for appropriate distribution of heated or cooled air. Of course, when a new system is installed, it is imperative that the balancing of the distribution of air should be adequately provided for. In consequence, it is important that the air flow from each outlet, and sometimes the inflow in collecting grills, should be capable of easy and accurate measurement by portable apparatus that can be handled by one person, as well as easily brought to the site and set up for service.

Some such apparatus has already become known, for example the kind disclosed in U.S. Pat. No. 4,030,358.

That known apparatus includes a flow-measuring instrument with an input probe grid distributed across an opening, so that a flow rate representative of the air flow across the various probe ends can be measured. The apparatus is provided with a hood, so that the air that flows by the probe ends of the instrument may be collected from an outlet by pressing the hood against the ceiling. Apparatus of that sort must operate with a fixed aperture surrounding the array of instrument probes through which the air must flow. In order to extend the range of the measuring instrument, there is disclosed the possibility of providing a by-pass within the instrumentation, by the opening of which the instrument can measure greater flows, which is to say greater pressures at the probes, than it could directly measure. Since the hood and the opening are part of the instrumentation, the entire unit must be returned if calibration or instrument repair should be necessary. Furthermore, because of the nature of the manifold of the measuring device, no determination of erratic airflow patterns from the outlet being measured can be determined. Finally, with a constant discharge opening, if the opening of the grill to be measured is greater, the device would create back pressures in the duct system giving false flow measrements. On the other hand, if the fixed discharge opening should be too large for the rate of flow to be measured, stratification (air leaving at one side only) could be encountered, likewise causing false flow rate indications.

It is an object of the present invention to provide a portable airflow rate measuring device which is capable of using a standard airflow meter that can be calibrated independently of the device of the invention, a device which can be adjusted so that such a standard airflow meter can have its range extended by a reliably applicable factor based on the adjustment of the device and, finally, a device by which the size of the discharge opening will always be appropriately related to the opening the airflow through which is being measured, so as to avoid errors resulting from back pressure, stratification or even turbulent flow.

SUMMARY OF THE INVENTION

Briefly, a box-like hood has an aperture portion which comprises members of sheet material operable together for varying the air-flow opening of the device while maintaining a regular polygonal aperture, preferably a square aperture, of which the area can be varied without changing its shape, and a resilient perimeter seal strip cooperating with the movable members. In a preferred embodiment the movable members are curtains each passing around a roller so that the portion of curtain not in use can in large part be withdrawn vertically, so that the aperture can occupy most of the area of the end panel of the hood. Means are provided for mounting, centrally of the opening, a probe of a standard air velocity measuring instrument, as well as a bracket for holding the indicating dial of the instrument, so that the measured flow rate can readily be observed by the same person that holds the device against the outlet of which the flow is being measured. A collapsible structure is provided which folds down against the portions of the apparatus just mentioned and can be set up to provide a hood leading air from a wall, ceiling or floor surfaces opening to the measuring opening, or vice versa, and making provision for setting up vanes within the hood which are readily brought into place for connecting up when the apparatus is unfolded for use, so as to prevent whirling or cyclone flow of air upon being appreciably present at the discharge opening, even if there should be some vortex formation in the airflow in the immediate neighborhood of the outlet which is being measured.

In the apparatus of the invention, the measuring opening can be varied to maintain constant velocities through the opening and to ensure that duct back pressures are not created. Opening sizes ca be varied, for example, from 0.2 square feet to 1.8 square feet without additional devices, and the curtain system can easily be adjusted so that the aperture area may be accurately read off a scale. A unitary probe velometer instrument from any good manufacturer may be used and adapted to this device and instrument recalibration and repair does not render the device useless, since the calibration of the instrument is independent of the adjustment of the device. Furthermore, since the instrument probe can be located at an off-center position if desired, the probe can be positioned off center and the device rotated to detect erratic flow patterns from an outlet. The instrument mounting is adjustable, so that the probe attitude of the instrument can be varied. If the outlet to be measured is no higher than the extended distance of the operator's reach plus the axial length of the air measurement device, one person can take care of all the measurements and neither additional personnel nor ladders or stands are necessary.

The device is preferably made of sheet aluminum and aluminum angle bars and channels with a skirt of flexible sheet material, either of plastic or of light, tightly woven cloth. The vanes preferably have at least one bent-over edge for rigidity. Such a lip adds a small-scale turbulence that is actually helpful for the throughput measurement.

BRIEF DESCRIPTION OF THE DRAWINGS

The invention is further described by way of illustrative examples with reference to the annexed drawings, in which:

FIG. 6 is a detail, partly in section, illustrating the curtain-drawing system and its capability of calibration;

FIG. 7 is a detail, in section, of the bearing structure mounting the rollers for the curtain;

FIG. 8 is a detail, in plan view, partly broken away, of the scale slider of FIG. 2;

FIG. 9 is a face view and FIG. 10 a side view of the adjustable hinge for the instrument casing mount;

FIGS. 11 is a top view, partly broken away, showing the flow controlling vanes in set-up position and indicates the direction in which they may be respectively folded away;

FIG. 12 is a detail in perspective, and partly broken away, showing the manner in which the central junction of the vanes is secured;

FIG. 13 is a plan view, comparable to FIG. 11, illustrating the folded position of the vanes;

DESCRIPTION OF THE ILLUSTRATED EXAMPLE

Figure 1:
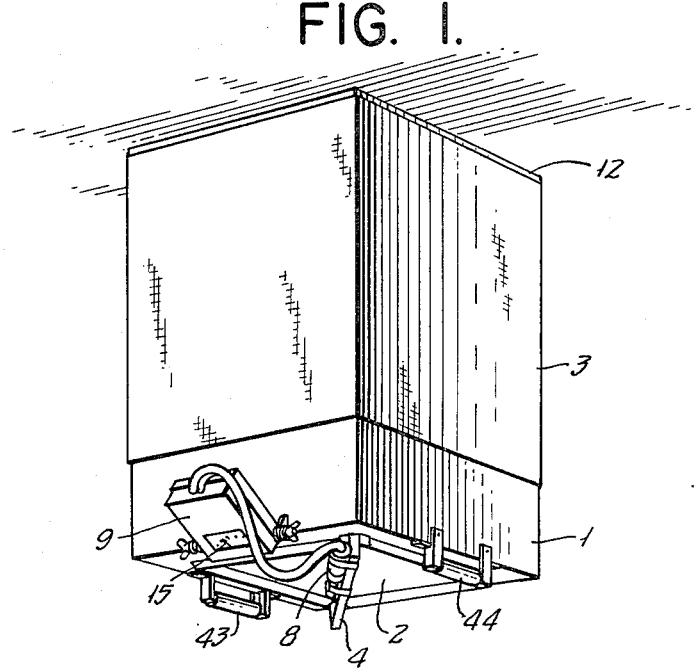
FIG. 1 is a perspective view of the device of the invention as it may be used, omitting the person holding it in place and reading the instrument, for simplification of illustration.

FIG. 1 shows the device of the invention in position of use, in which it would normally be held up by the person making a measurement therewith, the person holding the device in place not being shown to simplify the illustration. The device consists of a hollow body having a fixed frame 1 forming its lower portion, having a central square aperture 2 which, as described below, is variable in size, and above the frame 1, a folding, more or less cubical enclosure 3, which is open both at the top and at the bottom, the lower opening leading into the frame 1. An instrument bar 4 is mounted obliquely across the bottom of the device, passing across the opening 2, suspended by its bent-up ends 5 and 6. The probe head 8 of a velometer instrument 9 is fastened to the bar 4 by a grasping tape 11 of the kind known by the name "VELCRO." The top rim of the folding enclosure 3 which is faced with a sealing strip 12 (see FIG. 3) is pressed against the ceiling, so that all the air coming out of an outlet of a ventilating, heating or air-conditioning system will be required to flow out the opening 2 at the bottom of the frame 1. The instrument 9 is mounted on a hinged bracket on the frame 1 in the manner more particularly described below in connection with FIGS. 9 and 10, so that it may be set at an angle suitable for the person holding up the device against the ceiling to read the position of a pointer on the instrument scale 15.

Figure 2:
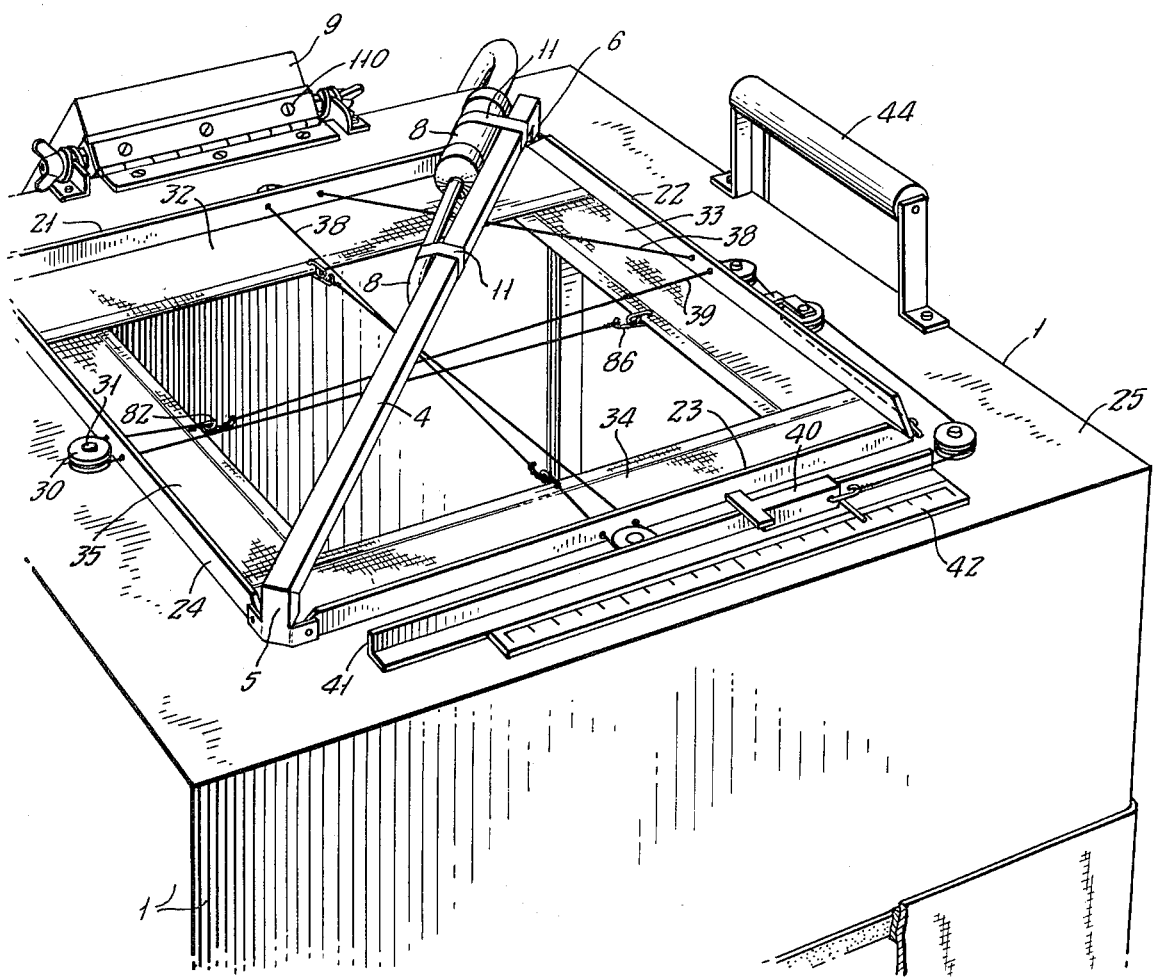
FIG. 2 is a perspective view of the portion of the device framing the discharge opening, as it would appear when placed upside-down, resting on the floor.

FIG. 2 shows the device of FIG. 1 resting on the floor, with the aperture 2 at the top. It will here be seen that the absolute maximum size of the opening 2 illustrated in FIG. 1 is set by the position of the lips 21,22,23,24 of the bottom member 25 of the frame 1. Adjacent to the center of each of these lips is a pulley 30, turning on a stud 31 fastened to the frame bottom 25. These serve in a cord and pully system more fully illustrated in FIGS. 4 and 5 for simultaneously drawing closed the curtains 32,33,34 and 35, or for simultaneously releasing them to enlarge the opening 2 under the action of springs shown in FIG. 3. The pulling or letting out of the cords 38 and 39, which together control the curtain movements, is performed manually by a slider 40 mounted on a rail 41 and carrying a scale pointer 42 which is kept in the place in which it is set in the manner explained below with reference to FIG. 8. Each of the cords 38 and 39 controls a pair of oppositely movable curtains in the manner illustrated in FIGS. 4 and 5.

FIGS. 1 and 2 also show the handles 43 and 44 for lifting the device.

Figure 3:
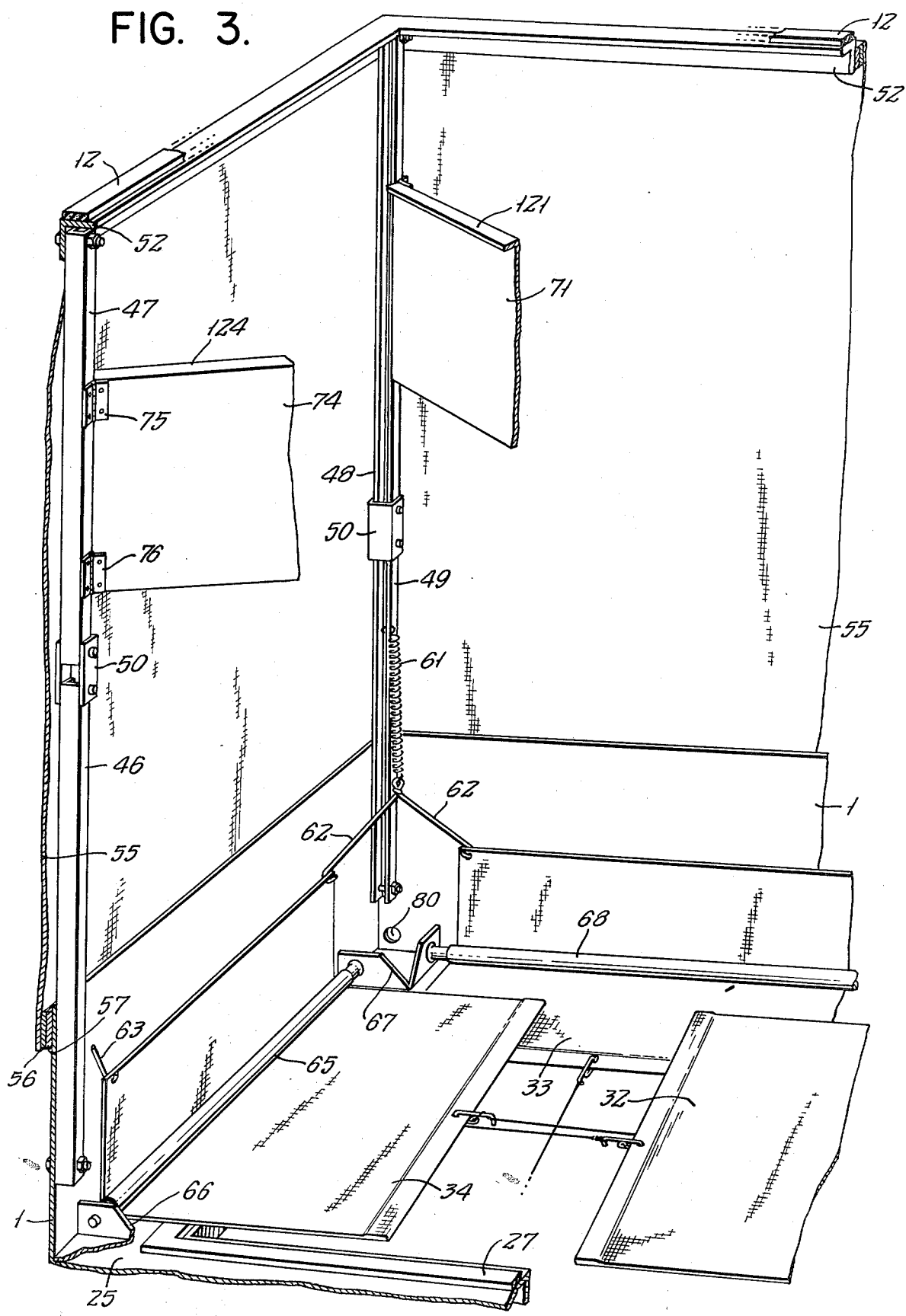
FIG. 3 is a diagrammatic view of a portion of the device, partly broken away and with the nearest of the curtains entirely removed, as seen from the interior, in diagrammatic perspective view.

FIG. 3 is a broken-away view of the interior of the bottom portion of the apparatus with one curtain omitted and another one only partly shown. In each internal corner of the frame 1 ends a folding leg made of two parts connected by a pivot joint so that the entire apparatus can be folded into the frame 1 in the manner illustrated in FIGS. 14-16. As is clearer in FIGS. 14 and 15, two adjacent legs have a longer bottom piece 46 and a shorter top piece 47 and the other two have a longer top piece 48 and a shorter bottom piece 49. In FIG. 3, the legs shown are set up straight between the lower sheet-metal frame 1 and the upper frame formed of the angle bars 52. The leg pieces 46-49 are conveniently in the form of channel bars and fit into short joint channels 50 for the "knee." A flexible skirt 55 is fully stretched when the apparatus is set up in a position partly shown in FIG. 3. It is attached to the frame by "VELCRO" strips 56 and 57. The perimeter sealing strip 60 provides an air-seal for the curtains. The sealing strip 12 has already been mentioned.

Each lower leg member, like the pieces 47 and 49 shown in FIG. 3 anchors a spring 61, at the lower end of which there is a curtain connector piece 62, preferably made of stiff wire, which hooks into the adjacent corners belonging respectively to two of the four curtains. These curtains control the size of the opening at the bottom of the apparatus. Only the connection to the curtains 33 and 34 shown in FIG. 3. The curtain 34, of course, at its other upper corner is connected to another curtain connector 63 that is pulled up by another spring, not shown, in another corner of the apparatus. The curtain 34 passes around a curtain roller 65 journaled in brackets 66 and 67 at its respective ends. Such a roller is provided for each of the four curtains, another of them being shown at 68 A pair of springs like the spring 61 tends to pull each of the four curtains up so as to enlarge the opening for air through the bottom face 25 of the frame, which is to say that leftward movement of the slider 40 of FIG. 1 stretches these springs as it pulls the curtain to close down the opening. The peripheral resilient strip 27, against which the curtains are pressed by downflowing air, prevents air from passing out around the back of the curtains.

Each of the upper leg members, like the members 46 and 48 of FIG. 3, carries a vane plate, such as the vanes 71 and 74 shown in FIG. 3, which are hinged to the leg members by hinges like those shown at 75 and 76, so that when the apparatus is folded up these plates or vanes can be swung flat in nesting pairs, as shown by comparison of FIGS. 11 and 13 preparatory to folding the leg members in the manner shown in FIGS. 14-17.

Figure 4:
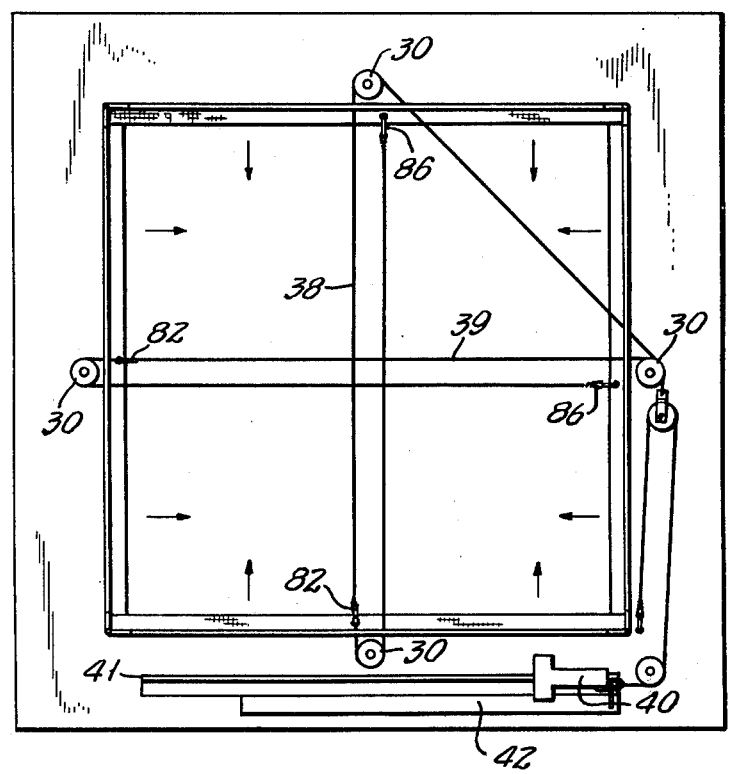
FIGS. 4 and 5 are diagrams illustrating the curtain control system of the device.
Figure 5:
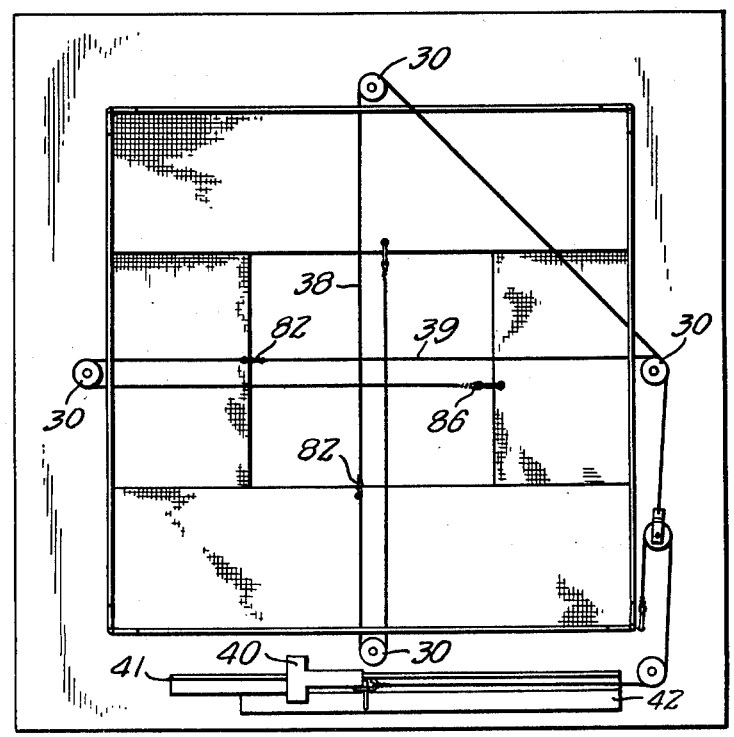

FIG. 4 is a plan view of the curtain arrangement, with the curtains in the widest open position with curtain-end battens just in front of the lips 21-24. FIG. 4 is a top view of the apparatus set upside-down, resting on the floor, as in FIG. 2. The slider 40 in FIG. 4 is at the right-hand end of the scale 42. FIG. 5 shows the curtain system in a more closed position.

FIG. 4 and 5 show how the slider 40 operates the two cords 38 and 39, and each of these in turn controls one pair of oppositely movable curtains. As shown more clearly in FIG. 6, the cords 38 and 39 proceed first across the aperture to the opposite curtain edge, which is fitted with a first connector 82, from which it continues on around the pulley 30 and back to the curtain over which it first passed (see FIGS. 4 and 5). The cord 38 or 39, as the case may be, is merely wrapped around a forward shank portion 83 of the connector 82 and then fastened around a bend 83 of the connector. The number of turns wrapped around the connector serves as a calibration adjustment as does also the deformation that may be made in each second connector 86 (FIGS. 4 and 5).

FIG. 7 shows how one end of a curtain roller such as the roller 68 is journaled on a bracket 67 by means of a screw 77, a washer 78, and a tubular support nut 79. For removing any roller by applying a screwdriver to the head of the screw 77, access holes such as the hole 80 of FIG. 2 is provided in the frame 1.

FIG. 8 is a detailed view of the slider 40, showing the internal obliquely bent piece of metal 90 that cooperates with one side of the slider to grasp the rail 41. Because of the oblique tongue 90, the slider 40 slides easily to the left, but not to the right, so that in practice it is moved to the extreme right by picking it up and putting it down on the rail 41, opening the curtains to the maximum aperture position which is, for example, 1.8 square feet, compared to a minimum aperture position of 0.2 square feet, after which it can be slid to the left to whatever aperture size may be desired. The features of the slider and cord control for the curtain is, of course, merely illustrative because many ways of controlling and setting the curtains by moving them equally and simultaneously can be readily be devised that are entirely practical. The illustrated system has been found to be simple and reliable.

The bracket for the instrument 9 illustrated in FIGS. 1 and 2 can likewise be made firmly adjustable in various ways. The construction visible in FIG. 2, and more clearly shown in FIGS. 9 and 10 has been found particularly simple and effective. It utilizes at each end of the hinge 110 a screw 111, a wing nut 112, and washers 113 for grasping the fixed bracket 115 around the edge of which the screw 111 passes as the instrument 9 is swung on the hinge 110 while the wing nut 112 is loose. When the desired position of the instrument 9 is found, the wing nut 112 at each end is fastened to set the hinged bracket in that position. The device illustrated accommodates velometer instruments of various makes. The illustrated example corresponds to the appearance of the series 6000P velometer sold under the name "ALNOR."

FIGS. 11 and 12 are plan views of the vanes 71-74 that prevent cyclonic air motion, in set-up positions in FIG. 11 and folded away in FIG. 12. Arrows indicate how the vanes are swung to fold them before the legs are folded.

FIG. 12 is a detail view of the way the vanes are secured together when in the configuration of FIG. 11. A pair of opposite vanes 71 and 73 have notches 95 and 96 in the middle of their respective extreme edges by which they can be engaged for connection, while the other two vanes 72 and 74 have end lips 97 and 98 that hold by friction after they slide onto the overlap of the vanes 71 and 73, as permitted by the slots 100 and 101.

FIG. 13 is a view corresponding to FIG. 11 in which pairs of the vanes lie nested against opposite sides of the apparatus, in position for folding up the vane assembly and the apparatus as a whole.

The bent-over lips 121-124 along the edges of the respective vanes 71-74, at the top in the positions of FIGS. 1, 11, 12 and 13, stiffen the vanes and tend to prevent vibration thereof. They introduce small-scale turbulence in the air flow which is actually helpful because it helps to break up any larger pattern of lateral or circumferential flow that may be present, such as the cyclonic kind of flow which, if present, would falsify the measurement unless it were prevented by the presence of the vanes 71-74.

Figure 14:
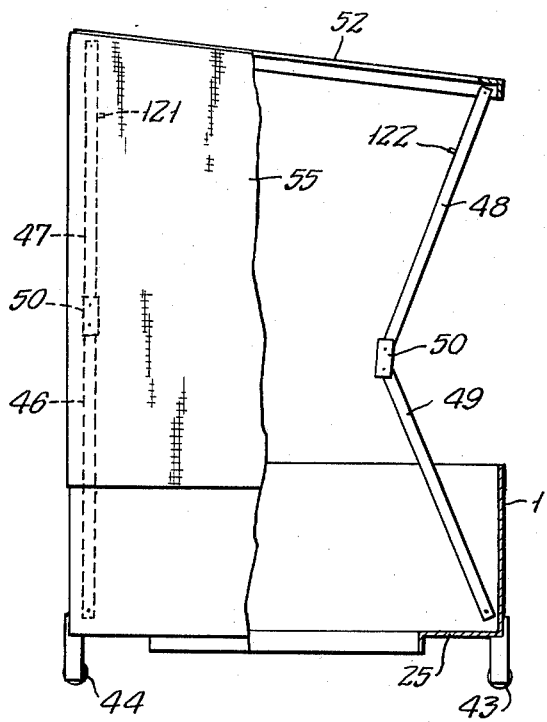
FIGS. 14, 15, and 16 are elevation views, partly in section and omitting the instruments support bracket, illustrating successive stages in folding up the hood frame.
Figure 15:
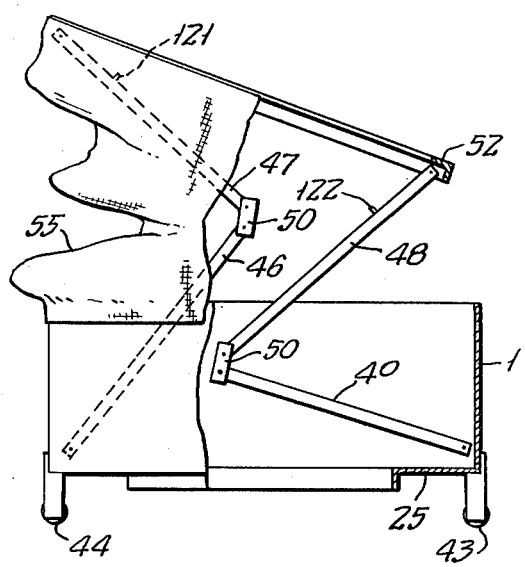
Figure 16:
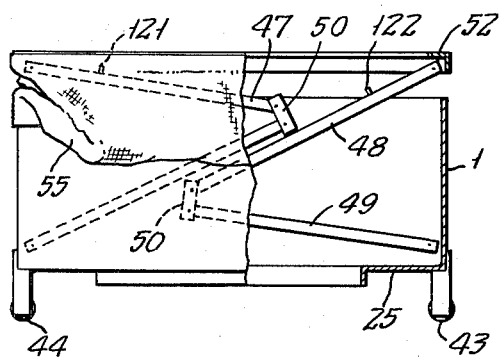
Figure 17:
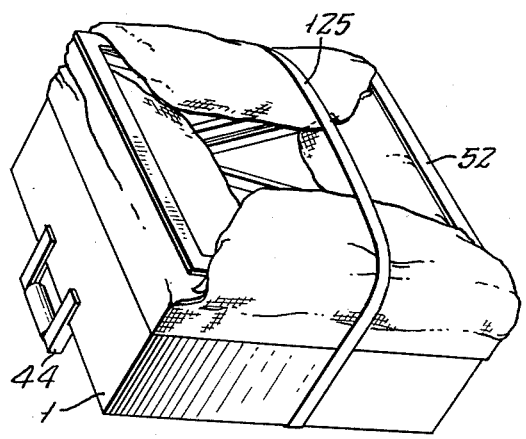
FIG. 17 is a perspective view of the device completely folded up for storage or transportation.

FIGS. 14-17 show how the device of the invention is folded up for storage or transportation. For simplification of the illustration, the instrument bracket and the instrument bar, as well as the rail 41 and the slider 40, pulleys 30, etc., have been omitted in these diagrammatic views. For ease of folding, the device is placed on the floor, resting on the handles 43 and 44. After the vanes have been folded against one side of the device as illustrated in FIG. 5, folding is begun with the pair of legs having the longer upper pieces 48 as shown in FIG. 14, after which the folding of the other pair of legs is begun as shown in FIG. 15. FIG. 16 shows the completion of the folding and FIG. 17 shows that thereafter the bunched-up portions of the skirt 55 are packed upwards and inwards and held in place by a strap 125. Even though the skirt 55 is relatively easy to remove and replace, as described in connection with FIG. 3, convenience is not served by removing it from the frame of the device when the device is folded up to be used again because the device is readily erected by reversing the sequence of steps described in connection with FIGS. 14-17, and then moving the vanes into position as illustrated in FIGS. 11 and 12, as already explained in connection with FIG. 12. When the vanes are in position they secure and brace the device in open position by the firm friction and resilient grip of the vanes with each other at their extremities. Here again, it should be noted that the other ways of slipping the vanes into a firm engagement holding them in position can be used to similar effect. Convenience is served as in the example illustrated in FIG. 12, when the vanes can be held in position without resort to the use of a bolt of screw.

It will, accordingly, be understood that a good many variations and modifications may be made of and to the illustrated example within the inventive concept.

We claim:

1. Portable apparatus for collecting and guiding an airflow to be measured, comprising:

a first frame (1) mounting an apertured panel (25) and provided with means for varying the open area of the panel aperture while maintaining it in a polygonal shape, said varying means comprising a plurality of movable members (32-35) of sheet material and means (38-42) for moving said members simultaneously and for indicating the aperture area defined by said members;

means (4) supported on said first frame for mounting the probe (8) of an air-velocity-meter adjustably with reference to the center of said aperture and for mounting the indicating portion (9) of said air-velocity-meter on said frame in an attitude making it easily readable by a person holding up said apparatus;

means (27) for sealing said members of said varying means with respect to said apertured panel (25);

a hood (3) foldable into said first frame and having folding legs (46-50) and a second frame (52,12) arranged to be held parallel to said first frame when said hood is erected; and vanes (71-74) hingedly connected to said legs, firmly engageable together within said hood in the central region thereof, with their surfaces parallel to the axis of said hood when said hood is erected.

2. Portable apparatus as defined in claim 1, in which said movable members of said area varying means are curtains each provided with a roller (65,68) and arranged to pass around said roller so as to permit the end portion of each curtain to be drawn up vertically when said aperture is widened while disposed in a horizontal plane.

3. Portable apparatus as defined in claim 2, in which said polygonal shape of said aperture is square.

4. Apparatus as defined in claim 1 or claim 2, in which said means (4) for mounting said probe (8) constitute means for mounting said probe essentially at the center of said aperture.

5. Apparatus as defined in any one of claims 1-3, in which said vanes (71-74) are arranged so as to nest in parallel pairs, each disposed between a pair of said legs, to facilitate folding of said legs.

6. Apparatus as defined in claim 3, in which said first (1) and second (52) frames are of square contour and in which said legs connect corners of said first and second frames so that when said hood is erected, each of said legs is straight and connects corresponding corners, respectively, of said frames.

7. Apparatus as defined in claim 6, in which each of said legs consists of two members (46,47,48,49) articulated, for swinging in one plane, where they are joined together and pivoted respectively on said frames at the respective other ends of said members for swinging in said plane.

8. Apparatus as defined in claim 7 in which the respective articulated joints of two of said legs are at a different level with respect to the axis of said hood from that at which the respective articulated joints of the other two legs are located when said hood is erected.

9. Apparatus as defined in claim 6 in which each of said vanes (71-74) is made of sheet metal and has a lip (121-124) which is disposed in a plane substantially perpendicular to said hood axis when said hood is erected.

10. Apparatus as defined in claim 9 in which each of one diagonally opposite pair (72,74) of said vanes also has an end lip (97,98) substantially at right angles to the vane surface and running parallel to said hood axis when said hood is erected and a slot (100,101) for passage of the horizontal lip (121,123) of one of the other pair (71,73) of said vanes when all the vanes are engaged together, the vanes of said other pair (71,73) having cooperating notches (95,96) in their respective free ends and having their end portions adjacent to said notches twist-bent to facilitate a firm engagement of said vanes of said last-mentioned pair (71,73).

11. Apparatus as defined in any one of claims 6-10 in which a set of spring (61) each located adjacent to a different one of said legs is provided for urging the free ends of said curtains apart from each other and arranged so as to pull upwards two adjacent corners respectively of two adjacent curtains, and in which apparatus said means (38-40) for simultaneously moving said curtains (32-35) are constituted as means for drawing and holding oppositely disposed pairs (32,34; 33,35) of said curtains together against the force of said springs.

* * * * *